UNITED STATES PATENT OFFICE.

ROBERT HINSHELWOOD AND CHAS. A. A. DURING, OF NEW YORK, N. Y.

IMPROVED WATER-PROOF CEMENT FOR LEATHER, &c.

Specification forming part of Letters Patent No. 38,480, dated May 12, 1863.

*To all whom it may concern:*

Be it known that we, ROBERT HINSHELWOOD and CHARLES A. A. DURING, both of the city, county, and State of New York, have invented a new and Improved Water-Proof Cement for Leather, &c.; and we do hereby declare that the following is a full, clear, and exact description of the same.

This invention consists in a composition of gutta-percha dissolved in bisulphuret of carbon and gum-shellac dissolved in alcohol, the whole being mixed with turpentine, camphene, benzine, or allied liquids, in such proportions as will be hereinafter more fully explained, for the purpose of producing a cement which is of peculiar advantage for joining or patching leather or other similar materials without sewing, more neatly, quickly, and permanently than by any of the modes now in use.

The proportion in which we mix the ingredients of our composition together is about as follows: gutta-percha, about fifty parts; bisulphide of carbon, five hundred parts; gum-shellac dissolved in alcohol, fifty parts; turpentine or benzine, one hundred parts. The gutta-percha is dissolved in the bisulphuret of carbon in the ordinary manner, and the solution of gum-shellac is added. Turpentine, benzine, or allied liquids are required to keep the cement in a fluid or moist state. Without the addition of those liquids the cement would quickly become dry and hard on account of the great volatility of the bisulphuret of carbon. By adding a solution of gum-shellac to the solution of gutta-percha the adhesive power of the cement is considerably enhanced.

Our cement is particularly applicable for the purpose of mending flaws, cracks, or breaks in boots, shoes, leather hose, &c.; for patchings flaws in skins intended for varnishing; also, for manufacturing boots and shoes in a water-proof manner by gluing two uppers together and inserting a portion of the cement between the inner and outer soles; also, for the purpose of making leather hose without the use of copper rivets; for the purpose of joining machine-belting, &c., and also for mending india-rubber shoes.

Our cement is applied in the following manner: For patching boots or skins, cut a piece of leather the size and shape necessary; shave off the edges fine and thin; scrape the surfaces to be joined to roughen the grain; apply the composition on both surfaces and allow the solutions to evaporate. Then gently heat both and apply the one to the other with a hard substance—such as a last—beneath; beat the part with a hammer to flatten inequalities, and then with a smooth iron, heated hot enough to boil a spittle, rub over the surface and edges, and adhesion will be perfect and permanent.

What we claim as new, and desire to secure by Letters Patent, is—

A water-proof cement consisting of the ingredients herein described, and mixed together in about the proportion and substantially in the manner specified.

ROBERT HINSHELWOOD.
CHARLES A. A. DURING.

Witnesses:
M. S. PARTRIDGE,
DANIEL ROBERTSON.